United States Patent
Nozaki et al.

(10) Patent No.: US 9,450,668 B2
(45) Date of Patent: Sep. 20, 2016

(54) PACKET RELAY SYSTEM AND WIRELESS NODE

(75) Inventors: Masanori Nozaki, Osaka (JP);
Kentarou Yanagihara, Hyoto (JP);
Yuki Kubo, Osaka (JP)

(73) Assignee: Oki Electric Industry Co., Ltd., Tokyo (JP)

(*) Notice: Subject to any disclaimer, the term of this patent is extended or adjusted under 35 U.S.C. 154(b) by 1170 days.

(21) Appl. No.: 12/591,575

(22) Filed: Nov. 24, 2009

(65) Prior Publication Data

US 2010/0195560 A1     Aug. 5, 2010

(30) Foreign Application Priority Data

Jan. 30, 2009   (JP) .................................. 2009-019809

(51) Int. Cl.
| | | |
|---|---|---|
| H04L 12/707 | (2013.01) | |
| H04L 12/721 | (2013.01) | |
| H04B 7/26 | (2006.01) | |
| H04B 7/155 | (2006.01) | |

(52) U.S. Cl.
CPC ............ *H04B 7/2606* (2013.01); *H04B 7/155* (2013.01)

(58) Field of Classification Search
CPC ....... H04B 7/15; H04L 45/12; H04L 45/121; H04L 45/123; H04L 45/22; H04L 45/28
USPC .......................................... 370/315; 709/239
See application file for complete search history.

(56) References Cited

U.S. PATENT DOCUMENTS

| | | | |
|---|---|---|---|
| 2002/0191573 A1* | 12/2002 | Whitehill et al. ............ 370/338 |
| 2003/0021227 A1* | 1/2003 | Lee et al. ...................... 370/228 |
| 2003/0126299 A1* | 7/2003 | Shah-Heydari ............... 709/252 |
| 2005/0175014 A1* | 8/2005 | Patrick ..................... 370/395.43 |
| 2005/0188108 A1* | 8/2005 | Carter et al. ................... 709/239 |
| 2006/0256741 A1* | 11/2006 | Nozaki .......................... 370/278 |
| 2008/0062945 A1* | 3/2008 | Ahuja .................... H04W 8/005 370/342 |
| 2008/0130534 A1* | 6/2008 | Tomioka ....................... 370/310 |
| 2009/0046587 A1* | 2/2009 | Kothari et al. ............... 370/238 |
| 2009/0201899 A1* | 8/2009 | Liu et al. ...................... 370/338 |
| 2009/0274055 A1* | 11/2009 | Kutschenreuter et al. ... 370/248 |
| 2010/0091823 A1* | 4/2010 | Retana et al. ................. 375/211 |

FOREIGN PATENT DOCUMENTS

| | | |
|---|---|---|
| JP | 2000-324127 A | 11/2000 |
| JP | 2006-279660 A | 10/2006 |
| JP | 2006-287565 A | 10/2006 |
| JP | 2008-301269 A | 12/2008 |
| JP | 2008-546276 A | 12/2008 |

OTHER PUBLICATIONS

ZigBee Document 053474r17, Oct. 19, 2007, sponsored by ZigBee Alliance.

* cited by examiner

*Primary Examiner* — Scott M Sciacca
(74) *Attorney, Agent, or Firm* — Rabin & Berdo, P.C.

(57) ABSTRACT

A packet relay system in which each node calculates a link cost of each adjacent node based on an arrival rate of a packet from each adjacent node, acquires an accumulated value of a link cost calculated by each node in a range of nodes from a sink node for each adjacent node, calculates, for each adjacent node, a path cost of the one adjacent node by adding the link cost calculated to the accumulated value, and relays a data packet to one adjacent node selected from among nodes adjacent to the node based on a path cost of each adjacent node. This enables establishment of an upstream path to a sink node without increasing the amount of communication in a network.

4 Claims, 19 Drawing Sheets

FIG. 4

| ADJACENT ADDRESS | LINK COST | PATH COST | PACKET ARRIVAL RATE |
|---|---|---|---|
| a | 2 | 2 | 0.8 |
| f | 5 | 8 | 0.5 |
| c | 1 | 4 | 0.9 |
| e | 2 | 6 | 0.8 |

FIG. 5A

| HEADER | | | | | PAYLOAD |
|---|---|---|---|---|---|
| PACKET TYPE | TRANSMISSION SOURCE ADDRESS | NUMBER OF POSSIBLE RELAYS | SEQUENCE NUMBER | PACKET LENGTH | NUMBER OF RETRANS -MISSIONS / DATA |

FIG. 5B

| HEADER | | | | | PAYLOAD | | | | |
|---|---|---|---|---|---|---|---|---|---|
| PACKET TYPE | TRANSMISSION SOURCE ADDRESS | NUMBER OF POSSIBLE RELAYS | SEQUENCE NUMBER | PACKET LENGTH | PASS COST | ADJACENT ADDRESS | LINK COST | ------ | ADJACENT ADDRESS / LINK COST |

FIG. 10

NODE b

| ADJACENT ADDRESS | LINK COST | PATH COST | PACKET ARRIVAL RATE |
|---|---|---|---|
| a | 2 | 2 | 0.8 |
| f | 5 | 8 | 0.5 |
| c | 1 | 3 | 0.9 |
| e | 2 | 4 | 0.8 |

NODE f

| ADJACENT ADDRESS | LINK COST | PATH COST | PACKET ARRIVAL RATE |
|---|---|---|---|
| a | 3 | 3 | 0.7 |
| b | 5 | 7 | 0.5 |
| e | 3 | 6 | 0.7 |
| i | 1 | 4 | 0.9 |

NODE c

| ADJACENT ADDRESS | LINK COST | PATH COST | PACKET ARRIVAL RATE |
|---|---|---|---|
| b | 1 | 3 | 0.9 |
| e | 4 | 8 | 0.6 |
| d | 3 | 6 | 0.7 |
| g | 2 | 5 | 0.8 |

NODE e

| ADJACENT ADDRESS | LINK COST | PATH COST | PACKET ARRIVAL RATE |
|---|---|---|---|
| b | 2 | 4 | 0.8 |
| f | 3 | 6 | 0.7 |
| c | 4 | 7 | 0.6 |
| g | 2 | 6 | 0.8 |

NODE h

| ADJACENT ADDRESS | LINK COST | PATH COST | PACKET ARRIVAL RATE |
|---|---|---|---|
| d | 2 | 8 | 0.8 |
| g | 1 | 6 | 0.9 |
| j | 1 | 7 | 0.9 |

FIG. 11

| ADJACENT ADDRESS | LINK COST | PATH COST | PACKET ARRIVAL RATE |
|---|---|---|---|
| d | 2 | 8 | 0.8 |
| g | 3 | 8 | 0.7 |
| j | 1 | 7 | 0.9 |

FIG. 15

| ADJACENT ADDRESS | LINK COST | PATH COST | PACKET ARRIVAL RATE |
|---|---|---|---|
| b | 1 | 3 | 0.9 |
| e | 4 | 8 | 0.6 |
| d | 3 | 6 | 0.7 |
| g | 2 | 5 | 0.8 |

| NODE | |
|---|---|
| 2ND HOP | 1ST HOP |
| a | b |
| f | b,e |
| i | g |
| j | g |
| h | d,g |

FIG. 20

| HEADER | | | | | | PAYLOAD | | | |
|---|---|---|---|---|---|---|---|---|---|
| PACKET TYPE | TRANSMISSION SOURCE ADDRESS | NUMBER OF POSSIBLE RELAYS | SEQUENCE NUMBER | PACKET LENGTH | NUMBER OF ADDRESSES | ADDRESS | -------- | ADDRESS | DATA |

| ADJACENT ADDRESS | LINK COST | PATH COST | PACKET ARRIVAL RATE |
|---|---|---|---|
| b | 1 | 3 | 0.9 |
| e | 4 | 8 | 0.6 |
| d | 3 | 6 | 0.7 |
| g | 2 | 5 | 0.8 |
| k | 1 | 4 | 0.9 |

| NODE | |
|---|---|
| 2ND HOP | 1ST HOP |
| a | b |
| f | b,e |
| i | g |
| j | g |
| h | d,g,k |

PACKET RELAY SYSTEM AND WIRELESS NODE

BACKGROUND OF THE INVENTION

1. Field of the Invention

The present invention relates to a packet relay system including a plurality of nodes that relay a data packet to each other.

2. Description of the Related Art

A multihop wireless network which includes a plurality of wireless nodes, each having a packet relay function, and in which adjacent wireless nodes relay a packet to each other is known in the art. Through sequential relay of packets between wireless nodes, each wireless node can transmit a packet to a wireless node that is out of radio arrival range of the node.

A routing protocol for determining a next wireless node, to which a packet is to be transmitted, from a destination address is needed in order to relay the packet to a desired wireless node. For example, routing protocols employing a variety of schemes such as a cluster tree routing scheme which requires no routing table by employing an address allocation method, an Ad Hoc On-Demand Distance Vector (AODV) which can construct a mesh topology, and a many to one scheme which can efficiently collect data from a plurality of nodes have been standardized in the ZigBee alliance. Especially, the many to one scheme is expected to be used for applications such as sensing of environmental information and automatic reading of a meter since the scheme is considered with 1-to-N communication between a sink node and a plurality of nodes.

FIGS. 1A to 1C are schematic diagrams illustrating how packets are relayed between nodes during routing in a many to one scheme. Specifically, FIG. 1A illustrates how a Route Request (RREQ) packet is relayed when nodes b to j each set an upstream path for relaying packets to a node a which is a sink node. The node a transmits an RREQ packet assuming that a destination address is a broadcast address. A node which has received the RREQ packet relays the RREQ packet to another node. The RREQ packet includes a path cost representing a logical distance between two arbitrary nodes on the network. When relaying the RREQ packet, the node adds a link cost of a node adjacent thereto to the path cost and transmits the RREQ packet. The link cost represents a logical distance between nodes which can directly communicate on the network and is used as a basis for calculating the path cost. The link cost is calculated from the strength of reception, a packet error rate, or the like between nodes. By repeating the relay of RREQ packets in this manner, each of the nodes b to j can set an upstream path for transmitting a packet to the sink node a. That is, each of the nodes b to j can relay a packet to the sink node under optimal conditions, for example, by selecting a node corresponding to the lowest path cost as a packet relay destination node.

FIG. 1B illustrates how an RREC (Route Record) packet is relayed when a downstream path from the node a, which is a sink node, to the node h is set. The node h transmits an RREC packet including an address of the node h, assuming that the destination is the node a. A node which has received the RREC packet transmits an RREC packet including an address of the node and the number of relays to a transmission destination node. That is, a packet to which addresses are added in order of nodes d, c, b, and a is transmitted from the node h to the node a. The same procedure is performed when a downstream path is set from the node a to a different node.

FIG. 1C illustrates how a packet is relayed from a node a to a node h after a downstream path is set. The node a transmits a data packet after writing addresses to a packet header of the data packet in an order opposite to the order in which the addresses are added when the downstream path is set. A node which has received the data packet deletes an address of the node written to the packet header and transmits the data packet to a transmission destination node. In this manner, a data packet can be relayed from the node a to other nodes in order of the nodes b, c, d, and h. This routing is referred to as "source routing" since it is a path control scheme in which the transmission source node (i.e., the source node) uniquely determines a node which relays the packet.

However, the link cost calculation method used for routing according to the conventional many to one scheme is not definite. In the ZigBee specification revision 17 (ZigBee Document 05374r17), a link cost is calculated from an element such as a Link Quality Indicator (LQI). However, this has a problem in that it is difficult to calculate a correct link cost since an LQI obtained when an RREQ command is received varies. Especially, when nodes are installed over a wide area such as the outdoors, temporary link disconnection may occur, changing link conditions, due to an obstacle such as a person and a car passing between the nodes. Therefore, there is a need to provide a system that can calculate an appropriate link cost even when link conditions have been changed.

In the case of routing according to the conventional many to one scheme, to establish an upstream path to the sink node, there is a need to broadcastly transmit the RREQ packet as shown in FIG. 1A at regular intervals. The RREQ packet is retransmitted once from each node and is delivered over the entire network. Therefore, there is a problem in that the amount of information communicated in the network increases and the use efficiency of wireless bands decreases as the size of the network increases. Therefore, there is a need to provide a system that can establish an upstream path to the sink node without increasing the amount of information communicated in the network.

In addition, in the case of routing according to the conventional many to one scheme, there is a problem in that traffic congestion occurs around the sink node when transmission timings of nodes overlap since each node transmits the RREQ command to the sink node through unicast transmission as shown in FIG. 1B in order to establish a downstream path from the sink node. Therefore, there is a need to provide a system that can establish a downstream path from the sink node without causing traffic congestion.

Further, in the case of routing according to the conventional many to one scheme, when a packet has not been correctly transmitted to a destination node due to influences such as changes in node connection conditions and temporary link disconnection, an RREC command is transmitted from the destination node to the sink node in order to reestablish a downstream path from the sink node. When this process is performed, there is a problem in that it is not possible to perform the downstream communication as shown in FIG. 1C until the downstream path is reestablished. Therefore, there is a need to provide a system that can quickly transmit a packet to a destination node even when path relay has failed midway on the downstream path from the sink node.

SUMMARY OF THE INVENTION

Therefore, the invention has been made in view of the above problems, and it is an object of the invention to provide a packet relay system that can calculate an appropriate link cost even when link conditions have been changed and thus can establish an upstream path to a sink node without increasing the amount of information communicated in a network.

It is another object of the invention to provide a packet relay system that can establish a downstream path from a sink node without causing traffic congestion.

It is another object of the invention to provide a packet relay system that can quickly transmit a packet to a destination node even when the packet has not been correctly transmitted to the destination node on a downstream path from a sink node.

In accordance with an aspect of the invention, the above and other objects can be accomplished by the provision of a packet relay system including a plurality of nodes that relay a data packet to each other, each of the nodes including: an arrival rate calculation unit which calculates an arrival rate of a packet from each node adjacent to the node among the plurality of nodes; a link cost calculation unit which calculates a link cost of each adjacent node based on the arrival rate for each adjacent node; an accumulated link cost value acquisition unit which acquires, for each adjacent node, an accumulated value of a link cost calculated by each node in a range of nodes from a sink node to each adjacent node among the plurality of nodes; a path cost calculation unit which calculates, for each adjacent node, a path cost by adding the link cost calculated to the accumulated value; and a packet relay unit which relays the data packet to one adjacent node selected from among nodes adjacent to the node based on the path cost of each adjacent node.

In accordance with another aspect of the invention, there is provided a packet relay system including a plurality of nodes configured in a tree format, each of the nodes including: a packet hold unit which holds a packet from one of nodes adjacent to the node among the plurality of nodes until a predetermined transmission time is reached; an aggregate packet generation unit which generates, when a packet is received from an adjacent node other than the one adjacent node until the transmission time is reached, an aggregate packet including an address list obtained by aggregating an address of the node, an address included in the packet held by the packet hold unit, and an address included in the received packet; and an aggregate packet relay unit which relays the aggregate packet to an adjacent node that is located at an uppermost node position among the adjacent nodes as the transmission time is reached.

In accordance with another aspect of the invention, there is provided a packet relay system including a plurality of nodes that relay a data packet to each other, each of the nodes including: a 2-hop adjacent node address acquisition unit which acquires, addresses of nodes adjacent to the node among the plurality of nodes, and addresses of second hop adjacent nodes adjacent to each of the adjacent nodes; a 2-hop adjacent node address storage unit which stores, for each of the second hop adjacent nodes, the address of each of the second hop adjacent nodes and the address of each of the adjacent nodes to the node which have a relationship corresponding to each other; a packet relay unit which relays, when it is determined that relay of the data packet, which is a packet to be transmitted to one second hop adjacent node adjacent to a first adjacent node of the adjacent nodes, to the first adjacent node is not possible, the data packet to an address of a second adjacent node among the adjacent nodes corresponding to addresses of the first adjacent node and the one second hop adjacent node in accordance with the address corresponding relationship stored in the 2-hop adjacent node address storage unit.

In accordance with another aspect of the invention, there is provided a wireless node that relays a data packet through a wireless communication path, the node including: an arrival rate calculation unit which calculates an arrival rate of a packet from each node adjacent to the node; a link cost calculation unit which calculates a link cost of each adjacent node based on the arrival rate for each adjacent node; an accumulated link cost value acquisition unit which acquires, for each adjacent node, an accumulated value of a link cost calculated by each node in a range of nodes from a sink node to each adjacent node; a path cost calculation unit which calculates, for each adjacent node, a path cost by adding the link cost calculated to the accumulated value; and a packet relay unit which relays the data packet to one adjacent node selected from among nodes adjacent to the node based on the path cost of each adjacent node.

The packet relay system according to the invention can calculate an appropriate link cost even when link conditions have been changed and thus can establish an upstream path to a sink node without increasing the amount of information communicated in a network.

In addition, the packet relay system according to the invention can establish a downstream path from a sink node without causing traffic congestion.

Further, the packet relay system according to the invention can quickly transmit a packet to a destination node even when temporary link disconnection has occurred on a downstream path from a sink node.

BRIEF DESCRIPTION OF THE DRAWINGS

FIG. 4 illustrates an example of a routing table;

FIG. 5A illustrates an example format of a sensor data packet;

FIG. 5B illustrates an example format of a hello packet;

FIG. 10 illustrates an example of the routing table in nodes b, c, f, e, and h;

FIG. 11 is a table illustrating an example routing table when a link cost has been changed;

FIG. 15 illustrates example aggregate RREC packets in relay steps;

FIG. 20 illustrates an example format of a downstream data packet;

DETAILED DESCRIPTION OF THE INVENTION

Embodiments of the invention will now be described with reference to the accompanying drawings.

First Embodiment

Figure 1C:
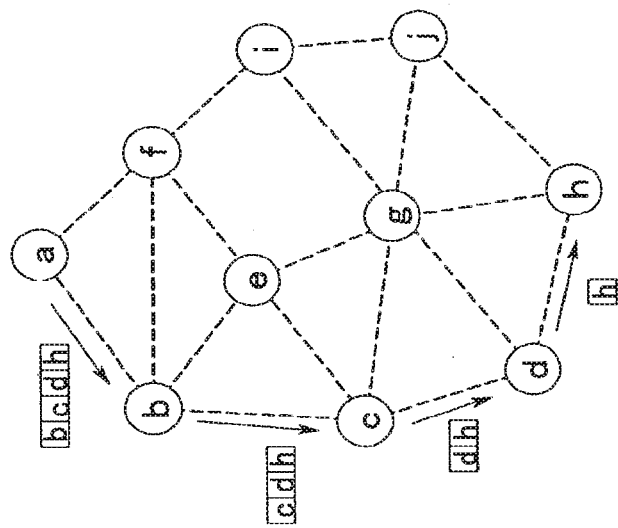
FIGS. 1A to 1C are schematic diagrams illustrating how packets are relayed between nodes during routing in a conventional many to one scheme.
Figure 1B:
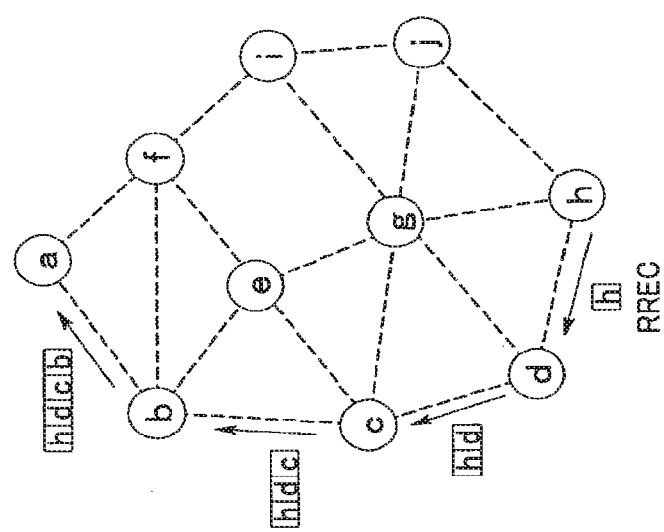
Figure 1A:
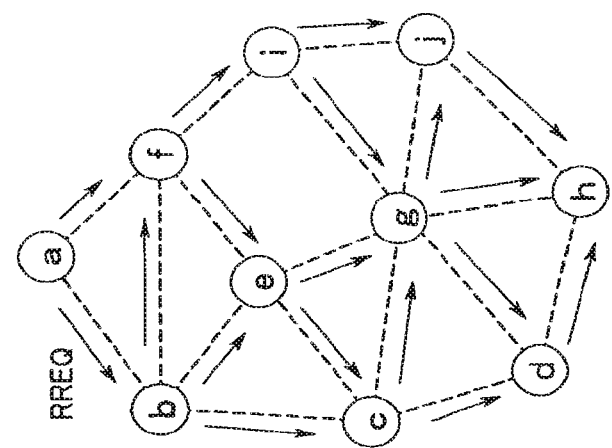
Figure 2:
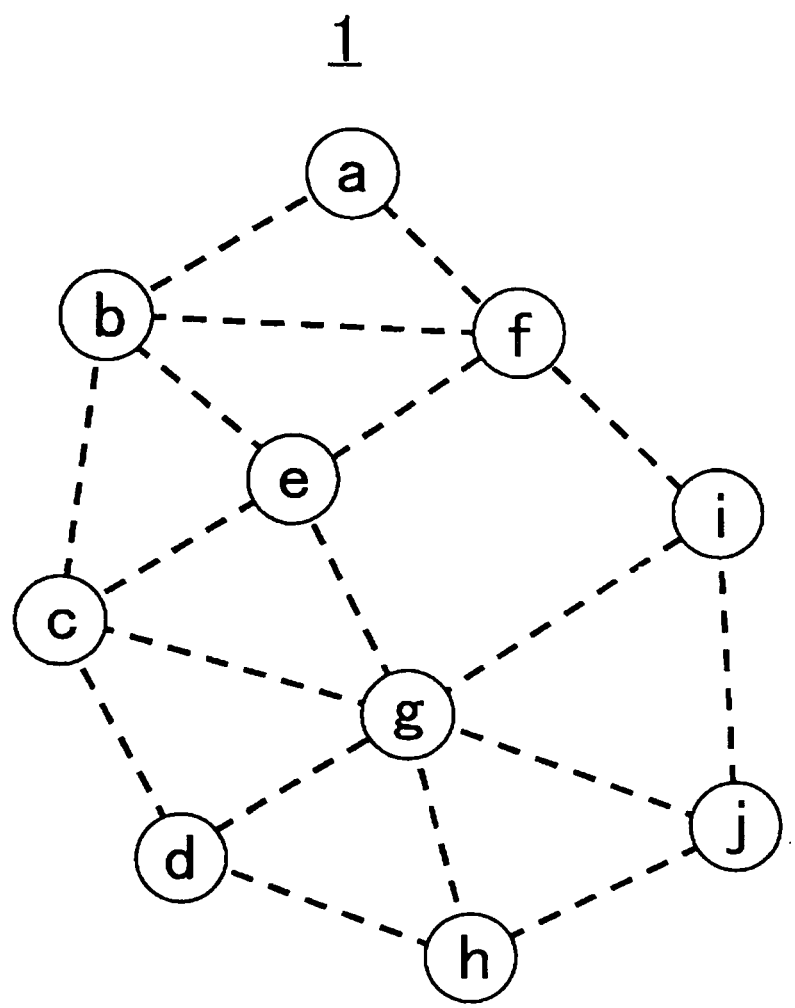
FIG. 2 is a schematic diagram illustrating a packet relay system according to a first embodiment.

FIG. 2 is a schematic diagram illustrating a packet relay system 1 according to this embodiment. The packet relay system 1 is, for example, a wireless sensor network and includes a node a which is a sink node and nodes b to j which are sensor nodes. Each of the nodes a to j can exchange a packet with an adjacent node through wireless communication. Nodes that are connected by dotted lines in FIG. 2 can exchange packets with each other. For example, the node a can exchange packets with the nodes b and f. In the packet relay system 1, for example, sensor data generated at each of the nodes b to j is aggregated at the node a.

Figure 3:
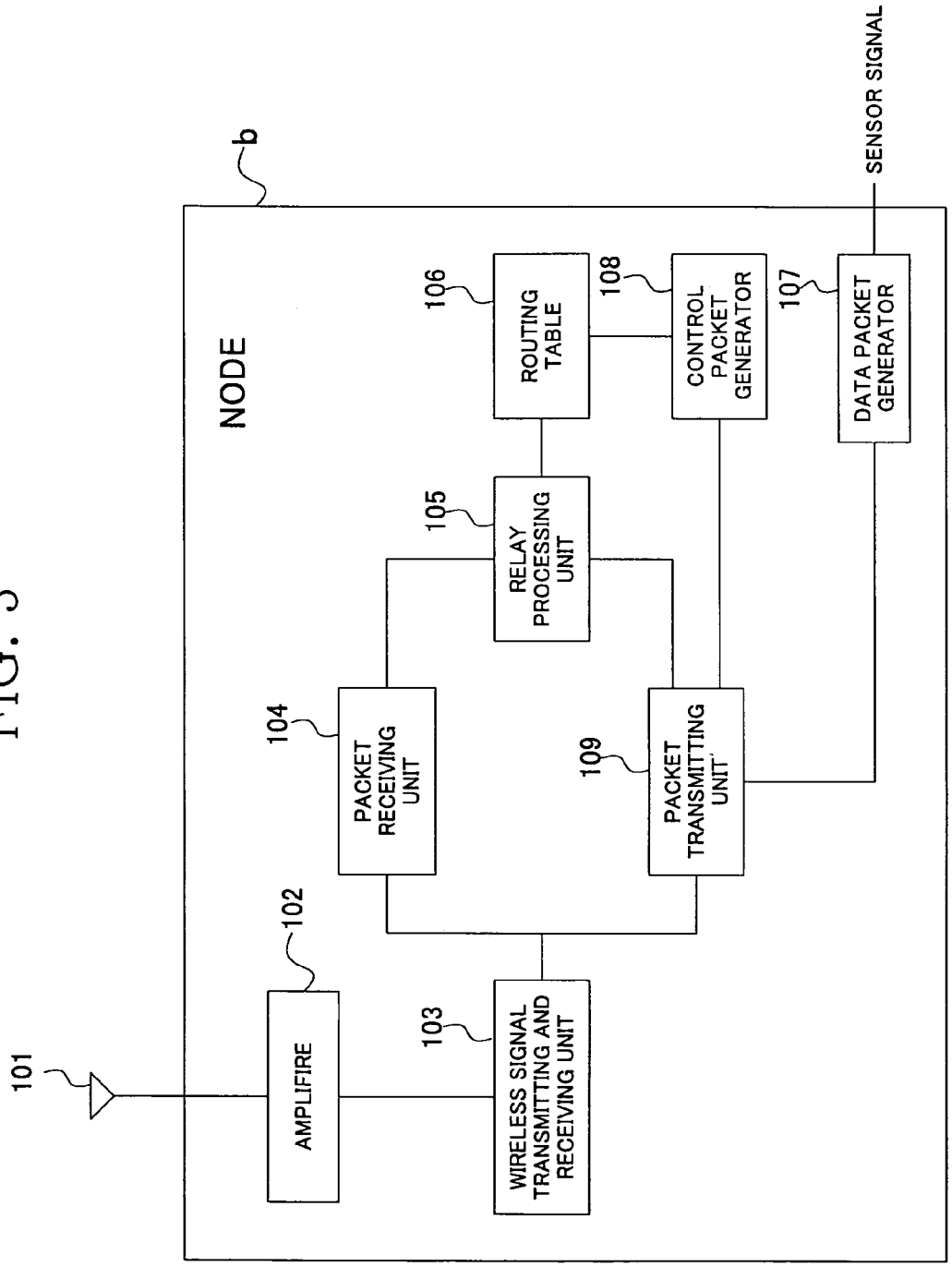
FIG. 3 is a block diagram illustrating a configuration of a node according to the first embodiment.

FIG. 3 is a block diagram illustrating a configuration of the node b according to this embodiment. Each of the nodes a and c to j has the same configuration as that of the node b.

The node b includes an antenna 101, an amplifier 102, a wireless signal transmitting and receiving unit 103, a packet receiving unit 104, a relay processing unit 105, a routing table 106, a data packet generator 107, a control packet generator 108, and a packet transmitting unit 109.

The antenna 101 transmits and receives a wireless signal with a node adjacent to the node b.

The amplifier 102 amplifies the strength of a wireless signal transmitted and received through the antenna 101 or an electric signal from the wireless signal transmitting and receiving unit 103.

The wireless signal transmitting and receiving unit 103 performs conversion between a wireless signal from the amplifier 102 and an electric signal from the packet receiving unit 104 or the packet transmitting unit 109 and performs modulation, demodulation, and frequency conversion processes on these signals and transmits and receives the wireless signal through the amplifier 102 and the antenna 101.

The packet receiving unit 104 receives a packet included in the wireless signal from the wireless signal transmitting and receiving unit 103.

The relay processing unit 105 determines the type of the packet received by the packet receiving unit 104 based on information included in the received packet. When it is determined that the packet is a control packet, the relay processing unit 105 updates the routing table 106 based on information included in the packet. When it is determined that the packet is a data packet, the relay processing unit 105 determines a relay destination node based on information of the routing table 106. The relay processing unit 105 is an arithmetic circuit such as, for example, a microprocessor.

The routing table 106 stores a link cost, a path cost, and a packet arrival rate of each node adjacent to the node b. The routing table 106 is a memory such as, for example, RAM.

FIG. 4 illustrates an example of the routing table 106 of the node b. The routing table 106 stores a link cost, a path cost, and a packet arrival rate for each of the nodes a, f, c, and e adjacent to the node b. For example, the link cost of the adjacent a is 2, the path cost is 2, and the packet arrival rate is 0.8. These information elements are updated by the relay processing unit 105.

The data packet generator 107 generates sensor data according to a sensor signal from a sensor not shown and generates a sensor data packet including the sensor data.

The control packet generator 108 generates a control packet such as a packet (hereinafter referred to as a "hello packet") for calculating a link cost, a path cost, and a packet arrival rate of each node adjacent to the node b and an RREC packet for setting a downstream path from the node a. Each of the control packet generator 108 and the data packet generator 107 is, for example, an arithmetic circuit such as a microprocessor.

FIG. 5A illustrates an example format of a sensor data packet. FIG. 5B illustrates an example format of a hello packet.

A header of each of the sensor data packet and the hello packet includes a packet type which is an identifier indicating the type of the packet, a transmission source address which is the address of a packet transmission source node, the number of possible relays indicating the limit of the number of relays of the packet, and a sequence number that is assigned to the packet.

A payload of the sensor data packet includes a packet length, the number of retransmissions, and data such as, for example, sensor data. The payload of the hello packet includes a packet length and a path cost and may further include a link cost for each adjacent address. Here, the path cost of the node b is an accumulated value of a link cost calculated by each node from the node a which is the sink node to the node b. That is the path cost is an accumulated link cost value.

The packet transmitting unit 109 causes the wireless signal transmitting and receiving unit 103 to transmit the packet generated by the data packet generator 107 or the control packet generator 108 to a node adjacent to the node b.

Each of the nodes a to j performs two main processes, i.e., the hello packet transmission process and the packet relay process, in parallel.

Figure 6:
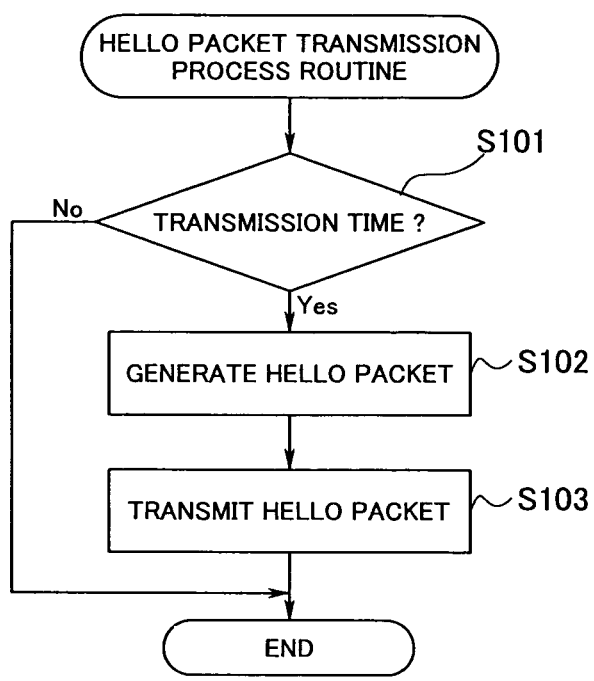
FIG. 6 is a flow chart illustrating a hello packet transmission process routine.

FIG. 6 is a flowchart illustrating a hello packet transmission process routine. The control packet generator 108 determines whether or not a periodic hello packet transmission time at intervals of a preset period of, for example, several seconds to several tens of seconds, has been reached (step S101) and generates a hello packet when the time has been reached (step S102). Here, the control packet generator 108 generates a hello packet having a payload including the minimum path cost among path costs of adjacent nodes stored in the routing table 106. For example, in the case where the routing table 106 created when the hello packet is generated at the node b is the same as shown in FIG. 4, the hello packet includes a minimum path cost of "2" in its payload. The packet transmitting unit 109 causes the wireless signal transmitting and receiving unit 103 to transmit the hello packet generated by the control packet generator 108 to a node adjacent to the node b (step S103).

Figure 7:
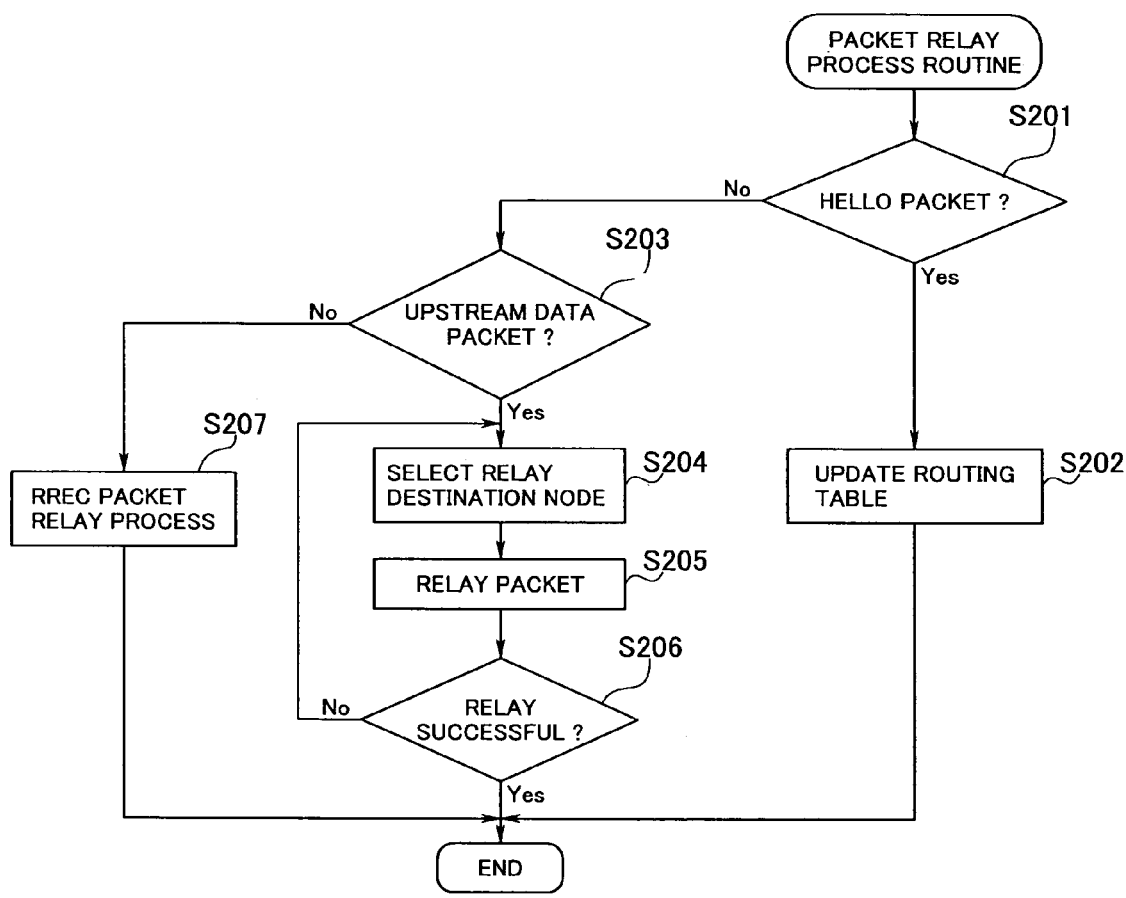
FIG. 7 is a flow chart illustrating a packet relay process routine.
Figure 8:
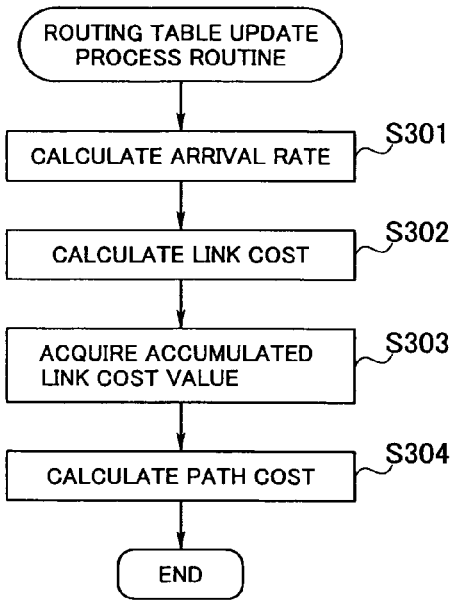
FIG. 8 is a flow chart illustrating a routing table update process routine.
Figure 9:
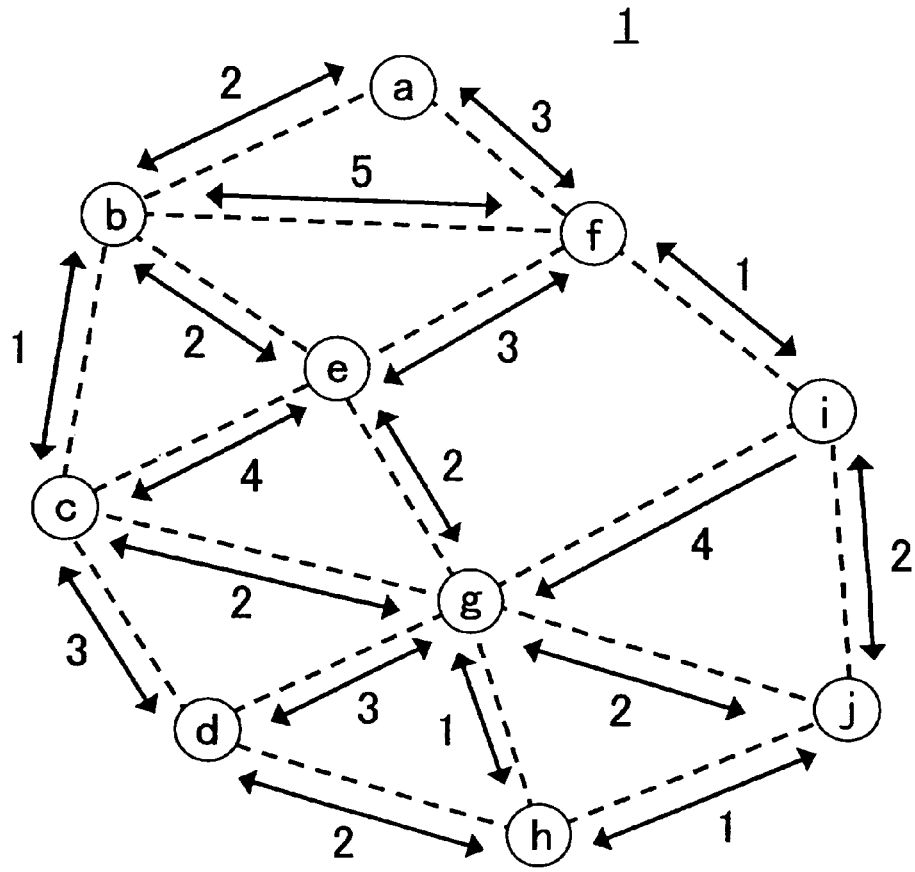
FIG. 9 illustrates a link cost between each pair of adjacent nodes.

FIG. 7 is a flow chart illustrating a packet relay process routine of each of the nodes a to j. FIG. 8 is a flow chart illustrating a routing table update process routine included in the packet relay process routine. FIG. 9 illustrates a link cost between each pair of adjacent nodes of the nodes a to j, where each link cost is denoted by a numeral value. FIG. 10 illustrates an example of the routing table 106 in the nodes b, f, c, e, and h. The packet relay processes of the nodes a to j are described below with reference to FIGS. 7 to 11.

The packet relay processes are described sequentially from the packet relay process of the node b adjacent to the node a which is the sink node.

The relay processing unit 105 determines whether or not a packet received by the packet receiving unit 104 is a hello packet from a packet type included in a header of the received packet (step S201).

The relay processing unit 105 updates the routing table 106 when it is determined that the packet is a hello packet (step S202). This hello packet has the format as shown in FIG. 5B described above.

The relay processing unit 105 determines a node that has transmitted the packet from a transmission source address included in the header of the packet and calculates a packet arrival rate of the node (step S301). When it is determined that the packet has been transmitted from, for example, the node a, the relay processing unit 105 calculates the packet arrival rate from a sequence number included in the header of the packet and a reception history of the hello packet from the node a. For example, when the number of hello packets transmitted from the node a, which have been received until the packet arrival rate is calculated, is 80 and the sequence number of the packet is 100, the packet arrival rate is 0.8 (=80/100). The relay processing unit 105 updates the packet arrival rate of the node a with the calculated arrival rate (see node b of FIG. 10). When the transmission source address of the packet has not been recorded in the routing table 106, the transmission source address is newly added to the routing table 106.

The relay processing unit 105 then calculates a link cost of each adjacent node (step S302). The relay processing unit 105 calculates the link cost, for example, using an equation "link cost=10−packet arrival rate*10. The link cost is 2 (=10−0.8*10) when the packet arrival rate of the node a is 0.8. The relay processing unit 105 updates the link cost of the node a with the calculated link cost (see node b of FIG. 10).

The relay processing unit 105 then acquires a path cost (i.e., accumulated link cost value) included in the packet (step S303). For example, when the packet has been transmitted from the node a, the path cost is 0 since the node a is the sink node.

The relay processing unit 105 calculates the path cost from the node b to the node a when the node b has relayed the packet to the node a (step S304). Specifically, the relay processing unit 105 calculates the path cost by adding the link cost "2" of the node a stored in the routing table 106 and the path cost "0" of the node a obtained from the packet received from the node a (i.e., 2=2+0). The relay processing unit 105 updates the path cost of the node a with the calculated path cost (see node b of FIG. 10)

In the case of the node f adjacent to the node a in the same manner as the node b, the relay processing unit 105 calculates a packet arrival rate, a link cost, and a path cost of the node a and updates the routing table 106 with the calculated values in the same manner as described above (see node f in FIG. 10).

The node b and the node f also exchange a hello packet with each other since they are adjacent to each other.

First, the node b calculates a packet arrival rate of "0.5" of the hello packet from the node f (step S301) and calculates a link cost of "5" of the node f (step S302). Since the node f transmits a hello packet having a payload including the minimum path cost "3" among path costs in the routing table 106 of the node f, the node b acquires the path cost "3" of the hello packet from the node f (step S303) and calculates a path cost from the node b to the node a when it has relayed the packet to the node f (step S304). Specifically, the node b calculates a path cost of "8" by adding the link cost "5" of the node f stored in the routing table 106 and the path cost "3" obtained from the packet received from the node f (i.e., 8=5+3). The relay processing unit 105 of the node b updates the packet arrival rate, the link cost, and the path cost of the node f with the calculated values (see node b of FIG. 10).

In the case of the node f, similarly, the relay processing unit 105 calculates the packet arrival rate, the link cost, and the path cost of the node b and updates the routing table 106 with the calculated values (see node f of FIG. 10).

Next, a description is given of the case of the node c adjacent to the node b. First, the node c calculates a packet arrival rate of "0.9" of a hello packet received from the node b (step S301) and calculates a link cost of "1" of the node b (step S302). Since the node b transmits a hello packet having a payload including the minimum path cost "2" among path costs in the routing table 106 of the node b, the node c acquires the path cost "2" of the hello packet from the node b (step S303) and calculates a path cost from the node c to the node a when it has relayed the packet to the node b (step S304). Specifically, the node c calculates a path cost of "3" by adding the link cost "1" of the node b stored in the routing table 106 and the path cost "2" obtained from the packet received from the node b (i.e., 3=1+2). The relay processing unit 105 of the node c updates the packet arrival rate, the link cost, and the path cost of the node b with the calculated values (see node c of FIG. 10).

Similarly, in the case of the node e adjacent to the nodes b and f, the relay processing unit 105 calculates a packet arrival rate, a link cost, and a path cost of each of the nodes b and f and updates the routing table 106 with the calculated values in the same manner as described above (see node e in FIG. 10).

The node c and the node e also exchange a hello packet with each other since they are adjacent to each other.

First, the node c calculates a packet arrival rate of "0.6" of the hello packet from the node e (step S301) and calculates a link cost of "4" of the node e (step S302). Since the node e transmits a hello packet having a payload including the minimum path cost "4" among path costs in the routing table 106 of the node e, the node c acquires the path cost "4" of the hello packet from the node e (step S303) and calculates a path cost from the node c to the node a when it has relayed the packet to the node c (step S304). Specifically, the node c calculates a path cost of "8" by adding the link cost "4" of the node e stored in the routing table 106 and the path cost "4" obtained from the packet received from the node f (i.e., 8=4+4). The relay processing unit 105 of the node c updates the packet arrival rate, the link cost, and the path cost of the node e with the calculated values (see node c of FIG. 10).

In the case of the node e, similarly, the relay processing unit 105 calculates the packet arrival rate, the link cost, and the path cost of the node c and updates the routing table 106 with the calculated values (see node e of FIG. 10).

Next, a description is given of the case of the node h that is located most distant from the node a. The node h calculates a packet arrival rate and a link cost of each of the adjacent nodes d, g, and j according to a hello packet from each of the adjacent nodes d, g, and j through the same process as described above (steps S301 and S302).

Each of the nodes d, g, and j calculates and stores the link cost and the path cost of each of the adjacent nodes in the routing table 106 in the same manner as described above. The node d transmits a hello packet including the minimum path cost "6" from the node d to the node a (i.e., through a path via the nodes a, b, and c), the node g transmits a hello packet including the minimum path cost "5" from the node g to the node a (i.e., through a path via the nodes a, b, and c), and the node j transmits a hello packet including the minimum path cost "6" from the node j to the node a (i.e., through a path via the nodes a, f, and I). The node h calculates a path cost of "8" by adding the path cost "6" obtained from hello packet from the node d and the link cost "2" of the node d stored in the routing table 106. Similarly, the node h calculates path costs of "6" and "7" with reference to the nodes g and j.

Each of the nodes b to j updates the routing table 106 by exchanging a hello packet with each adjacent node as described above.

The packet relay process of the node h is described below, referring back to FIG. 7.

When the relay processing unit 105 of the node h determines that a packet received by the packet receiving unit 104 is an upstream data packet from a packet type included in a header of the received packet (step S203), the relay processing unit 105 selects a relay destination node of the packet (step S204). As described above, the data packet has the format as shown in FIG. 5A.

Here, the relay processing unit 105 selects the node g corresponding to the minimum path cost "6" among path costs of the routing table 106 (see node h in FIG. 10) as a relay destination node and causes the wireless signal transmitting and receiving unit 103 to transmit the data packet to the node g (step S205). In this case, the data packet is transmitted in order of nodes h, g, c, b, and a. This allows the data packet to be relayed from the node h to the node a with the minimum path cost of "6".

When the packet receiving unit 104 has received a receipt confirmation packet from the node g, the relay processing unit 105 determines that the relay of the packet is successful (step S206) and terminates the packet relay process.

On the other hand, when no receipt confirmation packet has been received from the node g, the relay processing unit 105 determines that the relay of the packet is unsuccessful (step S206) and reselects a relay destination node (step S204). In this case, the relay processing unit 105 selects the node j corresponding to the path cost "7" that is next lowest relative to the path cost "6" corresponding to the node g as a relay destination node. The relay processing unit 105 causes the wireless signal transmitting and receiving unit 103 to transmit the data packet to the node j (step S205). In this case, the data packet is transmitted in order of nodes h, j, I, f, and a.

When it is determined that the relay of the packet corresponding to the node j is also unsuccessful, the relay processing unit 105 selects the node d corresponding to the path cost "8" that is next lowest relative to the path cost "7" corresponding to the node j as a relay destination node and causes the wireless signal transmitting and receiving unit 103 to transmit the data packet to the node d (step S205). When it is determined that the packet relay is unsuccessful for all the nodes d, g, and j, the relay processing unit 105 continues the packet relay process, for example, by reselecting the node g corresponding to the minimum path cost among path costs in the routing table 106 as a relay destination node and terminates the process when it is determined that the packet relay is unsuccessful.

The rate of arrival of a hello packet from the node g to the node h is reduced, for example, when a link condition between the node h and the node g is degraded since an obstacle such as a person or a car passes between the node h and the node g. For example, when the arrival rate is reduced to 0.7, the link cost of the node g calculated by the node h is 3 and the path cost thereof is 8. In this case, the routing table 106 of the node h is updated as shown in FIG. 11. That is, since the minimum path cost in the routing table 106 is 7, the relay processing unit 105 selects the node j corresponding to the minimum path cost "7" in the routing table 106 (in FIG. 11) as a relay destination node and causes the wireless signal transmitting and receiving unit 103 to transmit the data packet to the node j. In this case, the data packet is transmitted in order of nodes h, j, I, f, and a.

When relaying a data packet, the relay processing unit 105 subtracts 1 from a value indicating the number of possible relays included in a header of the data packet. When it is determined that the value indicating the number of possible relays is 0, the relay processing unit 105 terminates the packet relay process without relaying the data packet. Each time it is determined that the relay of the data packet is unsuccessful, the relay processing unit 105 subtracts 1 from a value indicating the number of retransmissions included in the header of the data packet. When it is determined that the value indicating the number of retransmissions is 0, the relay processing unit 105 terminates the packet relay process without relaying the data packet.

When it is determined that the packet received by the packet receiving unit 104 is not an upstream data packet from the packet type included in the header of the received packet (step S203), the relay processing unit 105 proceeds to an RREC packet relay process routine (step S207). Details of the RREC packet relay process will be described later in a second embodiment. Each of the nodes b to g, I, and j performs the relay process of the data packet in the same manner as described above.

In the packet relay system according to this embodiment, each of the nodes b to j can select an optimal path from the node to the node a as described above. That is, each node can select an adjacent node as a relay destination node of a data packet so as to minimize the path cost from the node to the node a.

Each node exchanges a packet with an adjacent node and calculates a link cost of the adjacent node based on the rate of arrival of the packet. Accordingly, each node can calculate an appropriate link cost between the node and an adjacent node even when link conditions between the node and the adjacent node have been changed. In addition, since each node calculates a path cost from the node to the sink node by adding link costs of nodes in a range from the node to the sink node, the node can calculate an appropriate value for the path cost according to the change of the link condition.

Further, each node acquires, from an adjacent node, an accumulated value of link costs calculated by nodes in a range from the sink node, which is not adjacent to the node, to the adjacent node and calculates a path cost from the node to the sink node from the accumulated value and a link cost that the node calculated for the adjacent node. Since each node calculates a path cost through this procedure, the node can establish an upstream path to the sink node without increasing the amount of information communicated in the network.

Furthermore, each node calculates and stores a path cost of each adjacent node so that, even when it has failed to perform packet relay for an optimal adjacent node, the node can appropriately select an adjacent node for use as a next packet relay target.

Second Embodiment

Figure 12:
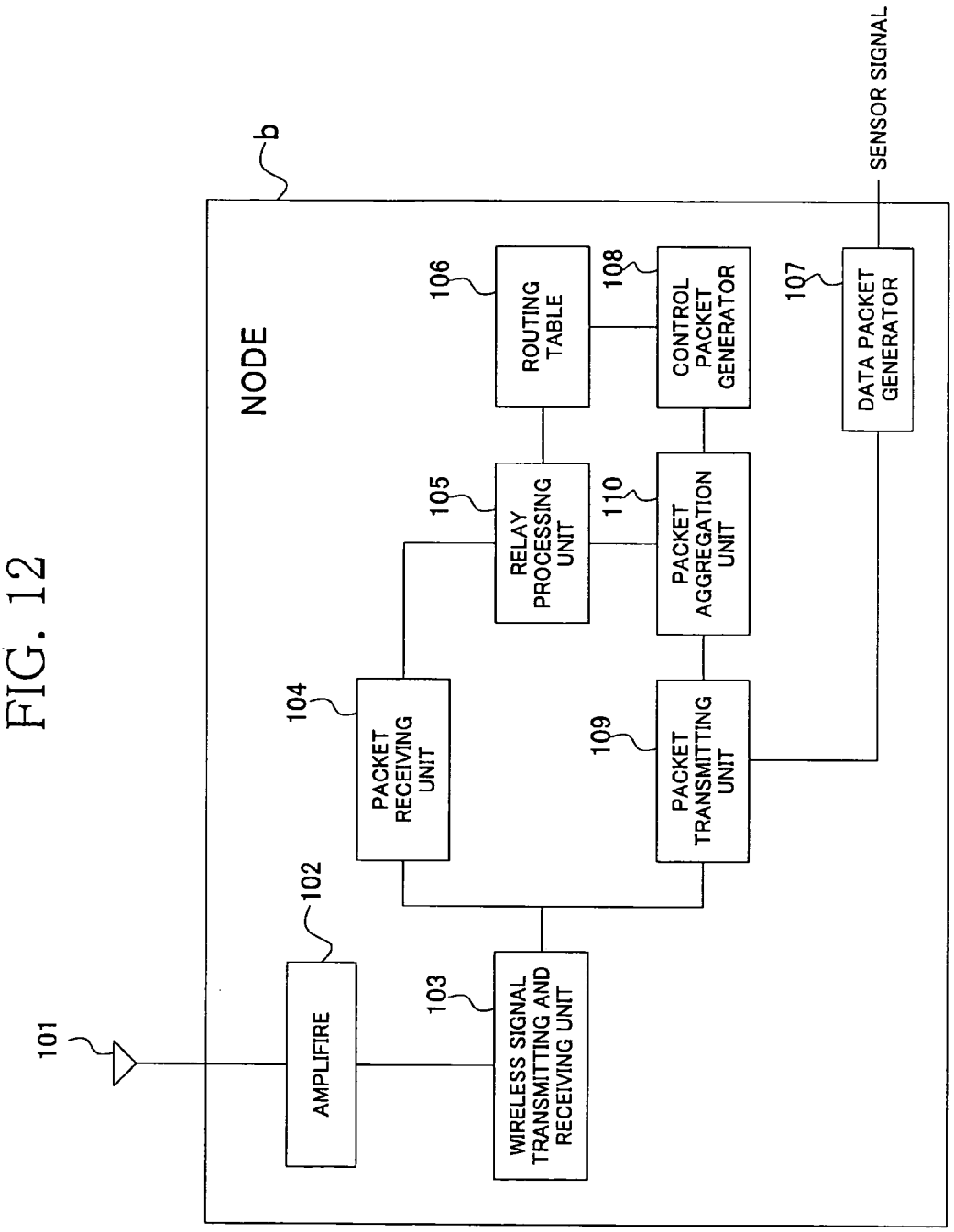
FIG. 12 is a block diagram illustrating a configuration of a node according to a second embodiment.

FIG. 12 is a block diagram illustrating a configuration of the node b according to the second embodiment. Each of the nodes a and c to j has the same configuration as that of the node b. The node b includes a packet aggregation unit 110 in addition to the components of the node b of the first embodiment.

When it is determined that the relay processing unit 105 has received an RREC packet from one of the adjacent nodes, the packet aggregation unit 110 holds the packet until a predetermined transmission time is reached and, when it is determined that the relay processing unit 105 has received an RREC packet from an adjacent node other than the one adjacent node before the predetermined transmission time is reached, the packet aggregation unit 110 generates a new RREC packet (hereinafter referred to as an "aggregate packet") which aggregates addresses of these RREC packets and causes the packet transmitting unit 109 to relay the aggregate packet to a relay destination adjacent node when the transmission time is reached.

Figure 13:
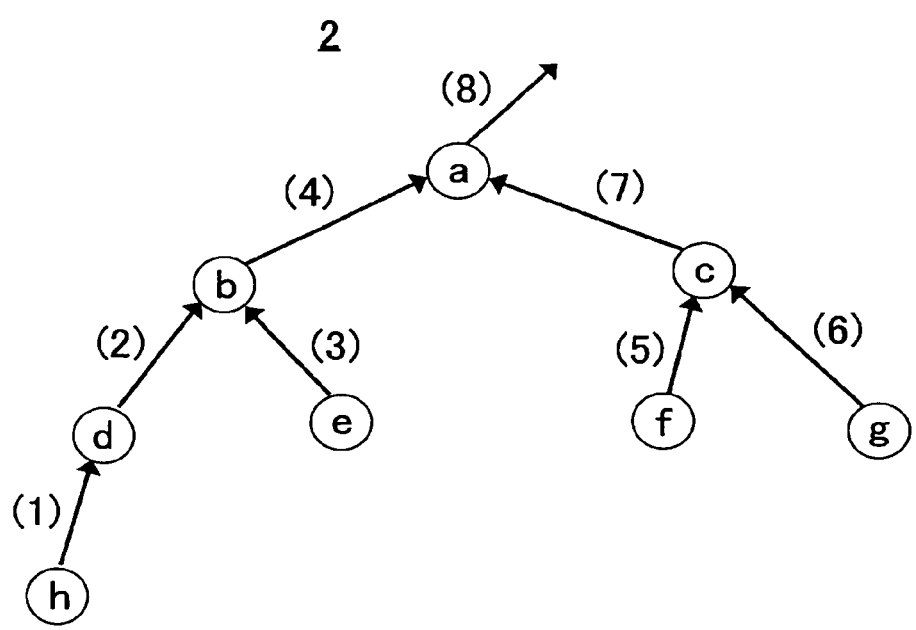
FIG. 13 illustrates a packet relay system formed in a tree format, together with relay directions of RREC packets.

FIG. 13 illustrates a packet relay system 2 formed in a tree format, together with relay directions of RREC packets. The packet relay system 2 includes a node a, which is the uppermost node, and nodes b to h which are arranged in a tree format while creating a hierarchical structure lower than the node a. Each of the nodes b to h sequentially relays an RREC packet from a node that is located at a lower side as represented by an arrow in FIG. 13 to a node that is located at an upper side. When each of the nodes b to h relays an RREC packet, the node incorporates its own address into the RREC packet. The packet aggregation unit 110 generates a new RREC packet that aggregates such addresses included in the RREC packet.

Figure 14:
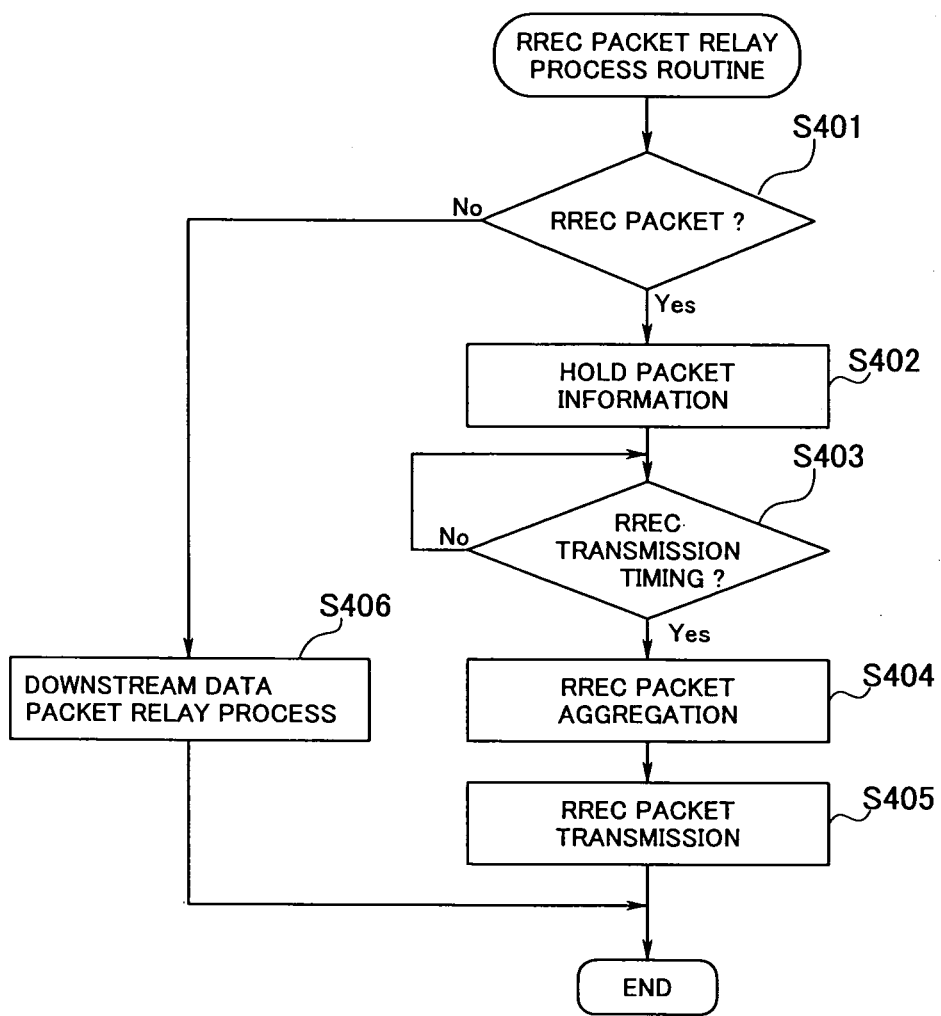
FIG. 14 is a flow chart illustrating an RREC packet relay process routine.

FIG. 14 is a flow chart illustrating an RREC packet relay process routine. This RREC packet relay process routine corresponds to the RREC packet relay process of step S207 in the packet relay process routine shown in FIG. 7. "(1)" to "(8)" in FIG. 15 denote example aggregate RREC packets in relay steps in association with numbers that are shown together with the arrows in FIG. 13. The RREC packet relay process will now be described with reference to FIGS. 13 to 16.

The packet relay processes of the nodes a to h are described sequentially from the packet relay process of the node h which is the lowermost node.

The control packet generator 108 of the node h generates an RREC packet including an address of the node h and transmits the RREC packet to the node d adjacent to the node h (see (1) in FIG. 13). Here, as denoted by (1) in FIG. 15, the control packet generator 108 generates an RREC packet including a header HD, a packet size LN of a payload of the packet, the number of addresses NM "1" included in the packet, and an address AD "h" such as, for example, an IP address of the node h. The address of the node h is simply referred to as an "address h". The addresses of the other nodes are also referred to as address a, address b, . . . , and address g.

The relay processing unit 105 of the node d determines whether or not the packet is an RREC packet from the packet type included in the header of the packet received by the packet receiving unit 104 (step S401). When the relay processing unit 105 has determined that the packet is an RREC packet, the packet aggregation unit 110 holds packet information included in the packet until a predetermined transmission time is reached (steps S402 and S403). For example, when the packet is an RREC packet from the node h, the packet aggregation unit 110 holds information such as the address h included in the RREC packet. The predetermined transmission time is a preset periodic time at intervals of, for example, several seconds to several tens of seconds.

When a predetermined transmission time is reached, the packet aggregation unit 110 of the node d transmits an RREC packet including the addresses d and h to the node b which is an upper node (step S405). Here, as denoted by (2) in FIG. 15, the packet aggregation unit 110 generates an RREC packet including a header HD, a packet size LN, the number of addresses NM "2", and addresses d and h. Since the packet receiving unit 104 of the node d receives no RREC packet from a node other than the node h, the packet aggregation unit 110 omits the RREC packet aggregation process of step S404.

The node e located below the node b also transmits an RREC packet as denoted by (3) in FIG. 15 to the node g which is an upper node through the same procedure as that of the node h.

When the relay processing unit 105 has determined that the packet received by the packet receiving unit 104 is an RREC packet (step S401), the packet aggregation unit 110 of the node b holds packet information included in the RREC packet until a predetermined transmission time is reached (steps S402 and S403). For example, when the packet is an RREC packet from the node d, the packet aggregation unit 110 holds addresses d and h included in the RREC packet.

When the relay processing unit 105 has determined that another RREC packet has been received by the packet receiving unit 104 before a predetermined transmission time is reached (step S401), similarly, the packet aggregation unit 110 of the node b holds packet information included in the RREC packet until a predetermined transmission time is reached (steps S402 and S403). For example, when the packet is an RREC packet from the node e, the packet aggregation unit 110 holds an address e included in the RREC packet.

When a predetermined transmission time is reached (step S403), the packet aggregation unit 110 of the node b aggregates the held information to generate a new RREC packet (step S404). Specifically, as denoted by (4) in FIG. 15, the packet aggregation unit 110 generates an RREC packet including a header HD, a packet size LN, an address group including respective addresses of a plurality of nodes that have a parent-child relation, and the number of addresses of each address group.

Here, the packet aggregation unit 110 of the node b generates a group of addresses b, d, and e, which includes the address b of the node b as a head address, the address d of the node d which is one child node of the node b as a second address, and the address e of the node e which is another child node of the node b as a third address and sets the number of addresses NM to "3". The packet aggregation unit 110 then generates a group of addresses d and h, which includes the address d of the node d as a head address and the address h of the node h which is one child node of the node d as a second address and sets the number of addresses NM to "2". In this manner, the packet aggregation unit 110 generates a new RREC packet (aggregate packet) as denoted by (4) in FIG. 15.

Figure 15:
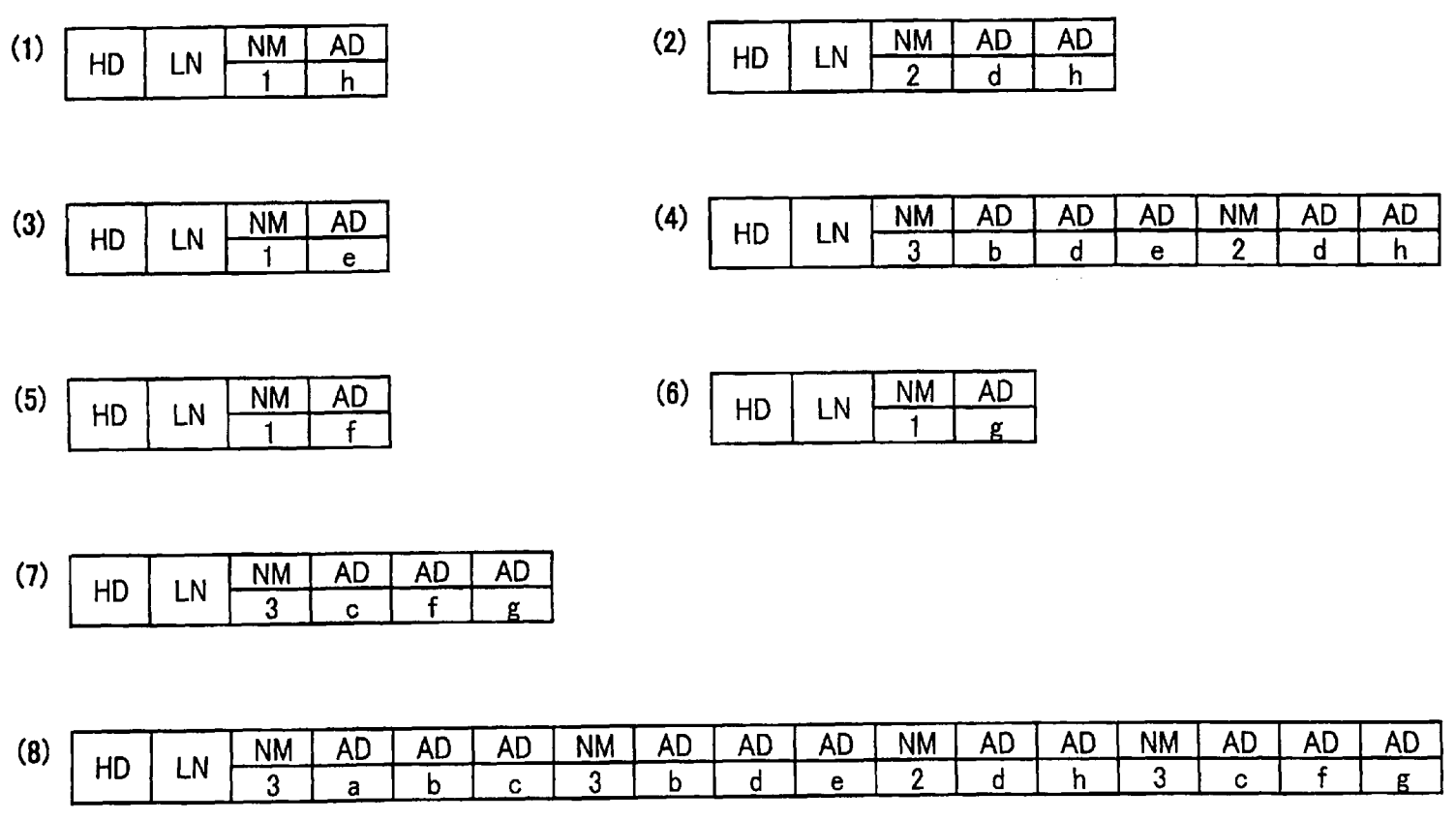

The packet aggregation unit 110 transmits the new RREC packet (see (4) in FIG. 15) to the upper node a (step S405).

The node c also performs the same RREC packet relay process as that of the node b. The packet aggregation unit 110 of the node c holds the address f included in the RREC packet (see (5) in FIG. 15) received from the node f and the address g included in the RREC packet (see (6) in FIG. 15) received from the node g until a predetermined transmission time is reached (step S402) and generates a new RREC packet when the transmission time is reached (step S403).

Here, the packet aggregation unit 110 of the node c generates a group of addresses c, f, and g, which includes the address c of the node c as a head address, the address f of the node f which is one child node of the node c as a second address, and the address g of the node g which is another child node of the node c as a third address and sets the number of addresses NM to "3". The packet aggregation unit 110 generates a new RREC packet (aggregate packet) with the number of addresses NM being set to "3" as denoted by (7) in FIG. 15. The packet aggregation unit 110 transmits a new RREC packet (see (7) in FIG. 15) to the upper node a (step S405).

The node a receives the RREC packets (see (4) and (7) in FIG. 15) respectively from the lower nodes b and c. When the node a is a sink node, the relay of the RREC packet is not performed. However, when the node a relays an RREC packet to an upper node, the packet aggregation unit 110 aggregates the addresses included in the RREC packets from the nodes b and c to generate an RREC packet as denoted by (8) in FIG. 15.

Here, the packet aggregation unit 110 of the node a generates a group of addresses a, b, and c, which includes the address a of the node a as a head address, the address b of the node b which is one child node of the node a as a second address, and the address c of the node c which is another child node of the node a as a third address and sets the number of addresses NM to "3". Then, the packet aggregation unit 110 generates a group of addresses b, d, and e, which includes the address b of the node b as a head address, the address d of the node d which is one child node of the node b as a second address, and the address e of the node e which is another child node of the node b as a third address and sets the number of addresses NM to "3".

Similarly, the packet aggregation unit 110 generates a group of addresses d and h with a number of addresses NM of "2" and a group of addresses c, f, and g with a number of addresses NM of "3" and generates a new RREC packet (see (8) in FIG. 15) including all of these address groups. The packet aggregation unit 110 transmits the RREC packet denoted by (8) in FIG. 15 to an upper node (not shown).

In the packet relay system according to this embodiment, when RREC packets are sequentially relayed from lower nodes among nodes formed in a tree format to an upper node, a new RREC packet (aggregate packet) generated by aggregating addresses included in RREC packets from lower nodes into address groups, which are created for respective parent-child relations, is transmitted to an upper node as described above.

In the conventional packet relay system, a relay node relays RREC packets transmitted by unicast from lower nodes without aggregating the RREC packets. Therefore, the conventional packet relay system has a problem in that traffic congestion may occur around the sink node when transmission timings of nodes overlap. However, in the packet relay system according to this embodiment, traffic congestion does not occur since one RREC packet generated by aggregating addresses included in RREC packets from lower nodes is relayed to an upper node. In addition, since address groups included in the RREC packet are created for respective parent-child relations, the uppermost sink node can determine the connection relation of lower nodes and can establish a downstream path from the sink node.

Third Embodiment

Figure 16:
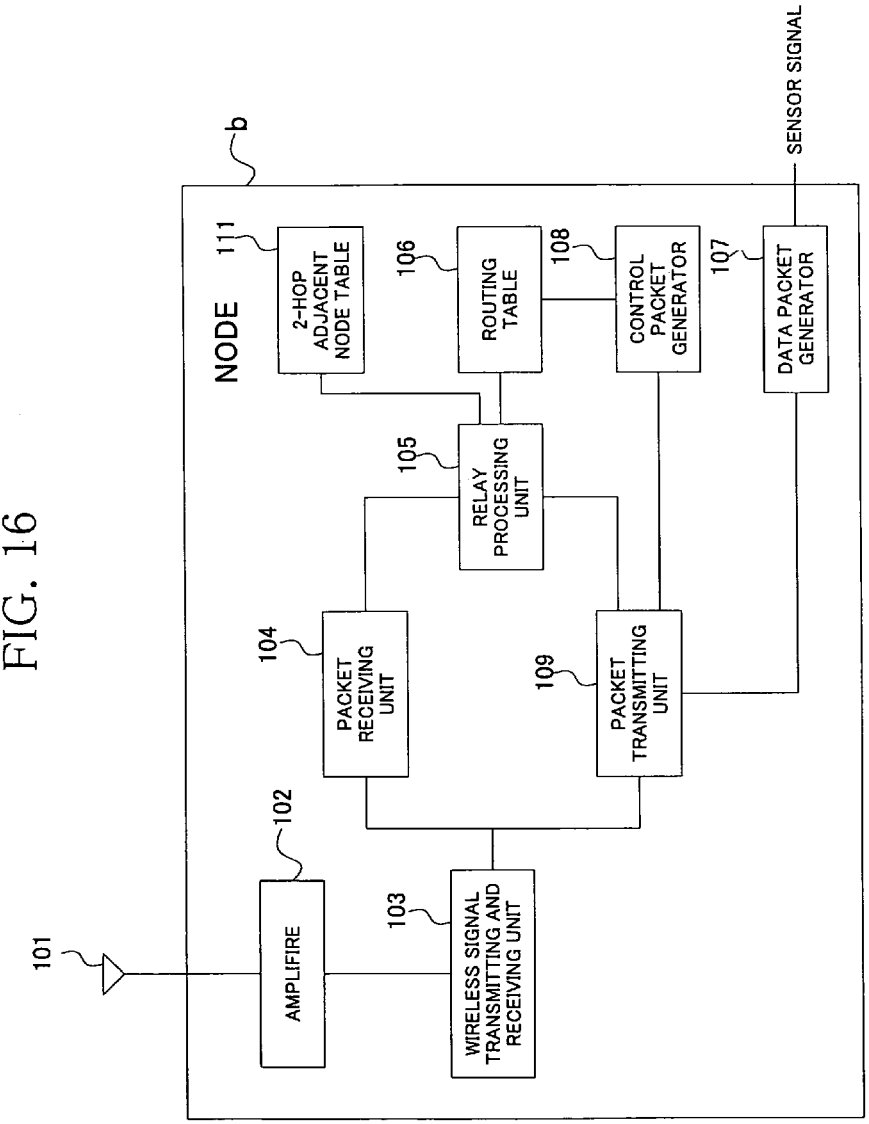
FIG. 16 is a block diagram illustrating a configuration of a node according to a third embodiment.

FIG. 16 is a block diagram illustrating a configuration of the node c according to the third embodiment. Each of the nodes a, b, and d to j has the same configuration as that of the node c. The node c includes a 2-hop adjacent node table 111 in addition to the components of the node b of the first embodiment.

Figures 17A, 17B, 18:
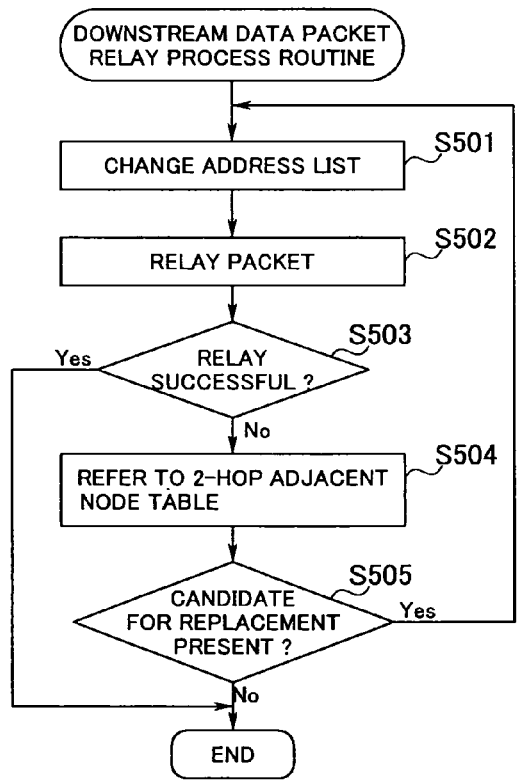
FIG. 17A is a table illustrating an example of the routing table of a node c.
FIG. 17B illustrates an example of the 2-hop adjacent node table of the node c.
FIG. 18 is a flow chart illustrating a downstream data packet relay process routine.

FIG. 17A illustrates an example of the routing table 106 of the node c. FIG. 17B illustrates an example of the 2-hop adjacent node table 111 of the node c. The node c not only includes the same routing table 106 as that of the first embodiment but also includes the 2-hop adjacent node table 111. An address of each first hop node and an address of each second hop node are stored in the 2-hop adjacent node table 111. Here, the first hop node is a node that is adjacent to the node c and the second hop node is a node that is adjacent to the first hop node and is not adjacent to the node c. For example, the nodes b, e, d, and g are first hop nodes of the node c and the nodes a, f, e, j, and h are second hope nodes thereof.

The relay processing unit 105 of the node c stores, in the 2-hop adjacent node table 111, addresses of first and second hop nodes which are determined based on adjacent addresses included in a payload of a hello packet as shown in FIG. 5B received at regular intervals of, for example, several seconds to several tens of seconds. For example, since the node b is adjacent to the nodes a, f, and e in addition to the node c, the node b transmits a hello packet having a payload in which addresses a, f, and e are included as adjacent addresses.

The relay processing unit 105 of the node c stores addresses, i.e., a and f which are not adjacent to the node c among the adjacent addresses a, f, and e, as the addresses of the second hop nodes in the 2-hop adjacent node table 111 while associating the node b with each of the addresses a and f. When the relay processing unit 105 has received a hello packet from another adjacent node, the relay processing unit 105 performs the same process to generate a 2-hop adjacent node table 111 as shown in FIG. 17B.

Figure 19:
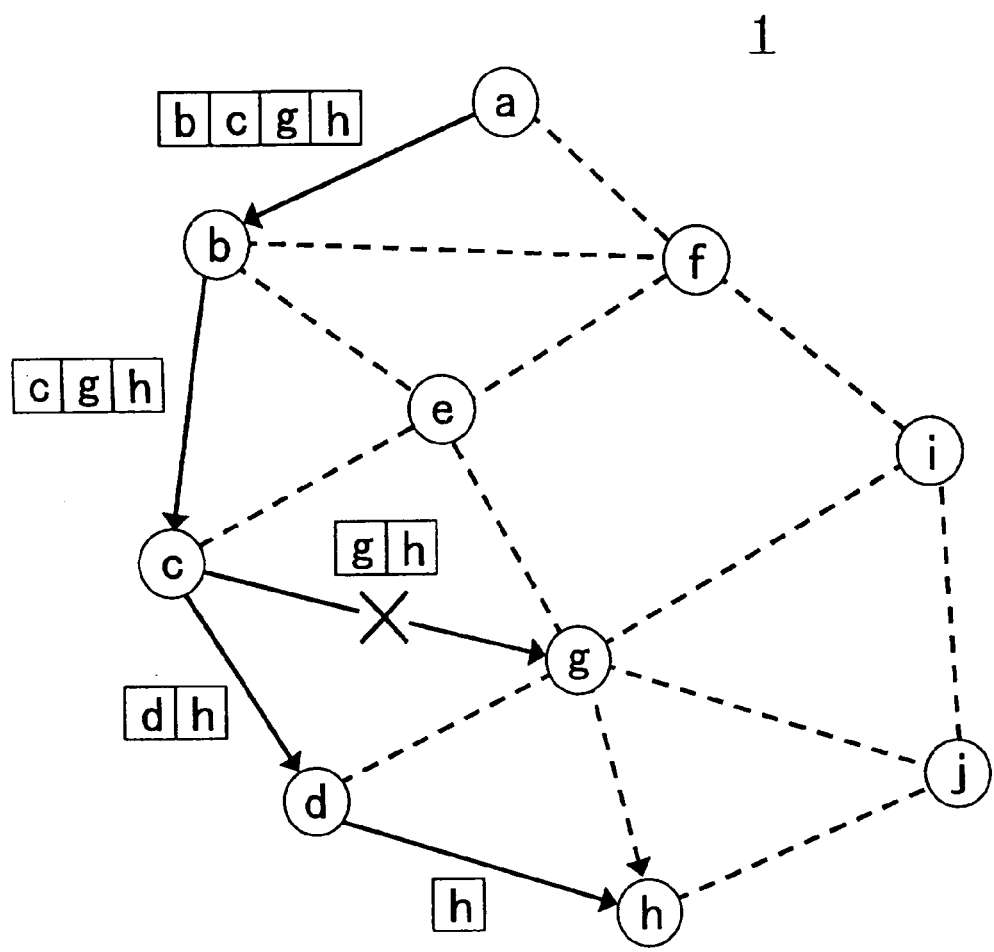
FIG. 19 illustrates a packet relay system together with downstream data packet relay directions and respective address lists of relay steps.

FIG. 18 is a flow chart illustrating a downstream data packet relay process routine. This downstream data packet relay process routine corresponds to the downstream data packet relay process of step S406 in the RREC packet relay process routine shown in FIG. 14. FIG. 19 illustrates a packet relay system 1 together with downstream data packet relay directions and respective address lists of relay steps. A downstream data packet relay process from a node a, which is a sink node, to a node h is described below with reference to FIGS. 18 and 19.

First, a description is given of a process performed at the node a as a sink node. FIG. 20 illustrates an example format of a downstream data packet. A header of the data packet includes a packet type which is an identifier of the type of the packet, a transmission source address which is the address of a packet transmission source node, the number of possible relays indicating the limit of the number of relays of the packet, and a sequence number that is assigned to the packet.

A payload of the downstream data packet includes a packet length, the number of addresses, the same number of addresses as the number of addresses, and data to be transmitted to a destination. In the following description, a group of addresses included in the payload is referred to as an "address list". Addresses have been written in order of addresses b, c, g, and h in an address list of a downstream data packet that is transmitted by the packet transmitting unit 109 of the node a. The relay processing unit 105 sets this address writing order based on a node connection status determined from an address group included in an RREC packet from a lower node received by the node a that is configured as described above in the second embodiment.

The relay processing unit 105 of the node b changes the address list included in the downstream data packet received from the node a by deleting the address b written at the head of the address list (i.e., deleting the address of the node b) (step S501). The relay processing unit 105 transmits the downstream data packet including the changed address list to a destination node (i.e., the node c) having the address c written at the head of the address list (step S502).

When it is determined that the packet receiving unit 104 has received a packet receipt notification from the node c, the relay processing unit 105 of the node b determines that the packet relay has been successfully performed (step S503) and terminates the relay process. When it is determined that the packet receiving unit 104 has received no packet receipt notification from the node c, the relay processing unit 105 of the node b determines that the packet relay was not successfully performed (step S503) and refers to the 2-hop adjacent node table 111 (step S504). Here, it is assumed that the packet relay from the node b to the node c has been successfully performed and the relay processing unit 105 of the node b terminates the packet relay process.

The relay processing unit 105 of the node c changes the address list included in the downstream data packet received from the node b by deleting the address c written at the head of the address list (i.e., deleting the address of the node c) (step S501). The relay processing unit 105 relays the downstream data packet including the changed address list to a destination node (i.e., the node g) having the address g written at the head of the address list (step S502). Here, it is assumed that the downstream data packet cannot arrive at the node g since temporary link disconnection has occurred due to an obstacle such as, for example, a person or a car passing between the node c and the node g.

When it is determined that the packet receiving unit 104 has received no packet receipt notification from the node g, i.e., that the packet relay was not successfully performed (step S503), the relay processing unit 105 of the node c refers to the 2-hop adjacent node table 111 shown in FIG. 17B (step S504). First, the relay processing unit 105 determines whether or not the node h written next to the node g in the address list in the second hop node addresses is stored as a second hop node address in the 2-hop adjacent node table 111 (i.e., the relay processing unit 105 searches for the node h in the 2-hop adjacent node table 111) (step S505).

When it is determined that the address h is stored as a second hop node address in the 2-hop adjacent node table 111, the relay processing unit 105 determines that a non-relayed node (i.e., the address d) among the first hop node addresses d and g corresponding to the address h is a destination of the downstream data packet. The relay processing unit 105 changes the addresses of the address list to the addresses d and h (step S501) and relays the downstream data packet to the node d (step S502).

The relay processing unit 105 of the node c determines that the packet receiving unit 104 has received a packet receipt notification from the node d (step S503) and terminates the packet relay process. By performing the same process as described above, the node d relays the downstream data packet including the address list, whose addresses have been changed to the address h, to the node h.

In the packet relay system according to this embodiment, as described above, each node stores each second hop destination node address included in a packet exchanged with an adjacent node while associating the second hop destination node address with adjacent node addresses. When it is determined that a node has failed to relay a packet to one of its adjacent nodes, the node selects one of the addresses associated with the second hop relay destination node address and relays the packet to the adjacent node of the selected address.

In the conventional packet relay system, when a packet is not correctly transmitted to a destination node, an RREC command is transmitted from the destination node to the sink node in order to reestablish a downstream path from the sink node and therefore it is not possible to perform downstream communication until the downstream path is reestablished. On the other hand, in the packet relay system according to this embodiment, the packet is relayed by changing the relay destination node of the packet and, therefore, even when a packet is not successfully relayed midway on a downstream path from the sink node, it is possible to quickly relay the packet to the destination node.

Although the node d is the only candidate for the replacement node in the case where the node c has failed to perform packet relay in the above example, the following procedure is performed when a plurality of candidates for the replacement node are present.

Figures 21, 22A, 22B:
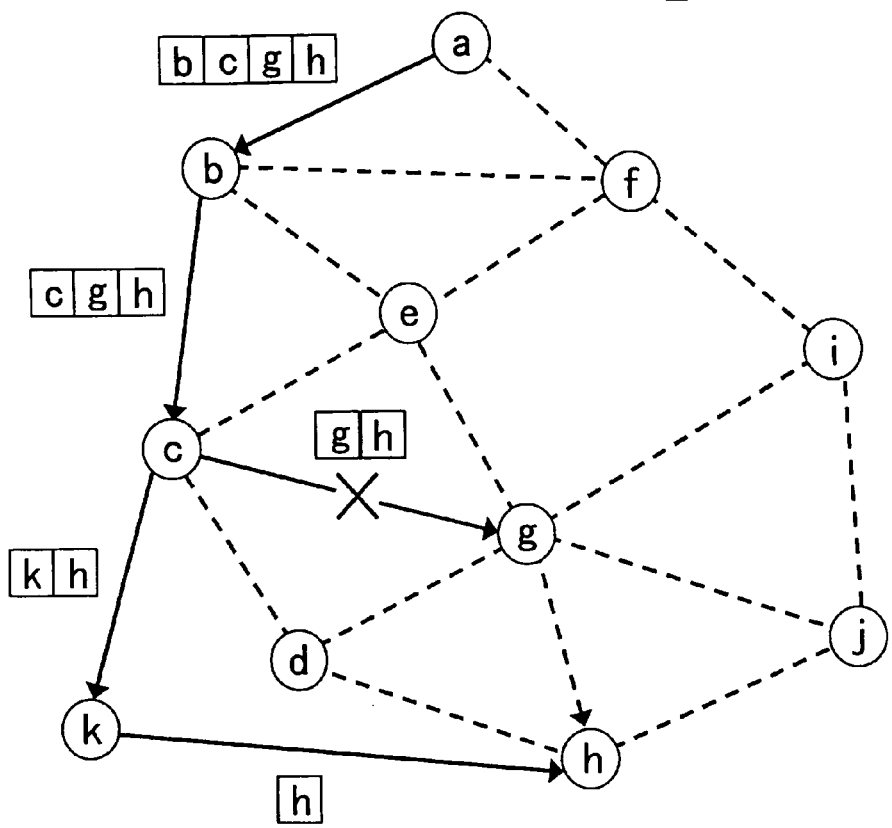
FIG. 21 illustrates a packet relay system together with downstream data packet relay directions and respective address lists of relay steps.
FIG. 22A illustrates an example routing table of the node c.
FIG. 22B illustrates an example 2-hop adjacent node table of the node c.

FIG. 21 illustrates a packet relay system 1 together with downstream data packet relay directions and respective address lists of relay steps. This packet relay system 1 includes a node k in addition to the components of the packet relay system 1 of the above example. The node k is adjacent to the nodes c and h. FIG. 22A illustrates an example routing table of the node c in the case of FIG. 21. This routing table further includes an adjacent address, a link cost, a path cost, and an arrival rate of the node k. FIG. 22B illustrates an example 2-hop adjacent node table of the node c in the case of FIG. 21. In this 2-hop adjacent node table, the addresses d, g, and k are associated with the address h of the second hop node h.

When it is determined that the relay processing unit 105 of the node c has failed to relay a downstream data packet to the node g (step S503), the relay processing unit 105 refers to the 2-hop adjacent node table 111 as shown in FIG. 22B (step S504).

The relay processing unit 105 determines whether or not the node h written next to the node g in the address list is stored as a second hop node address in the 2-hop adjacent node table 111 (step S505).

When it is determined that the address h is stored as a second hop node address in the 2-hop adjacent node table 111, the relay processing unit 105 determines that a non-relayed node (i.e., one of the address d or k) among the first hop node addresses d and g corresponding to the address h is a destination of the downstream data packet.

Here, referring to the routing table as shown in FIG. 22A, the relay processing unit 105 compares a link cost of "3"

corresponding to the address d with a link cost of "1" corresponding to the address k and determines that the node k whose link cost is less than the other is a destination of the downstream data packet. The relay processing unit 105 changes the addresses of the address list to the addresses k and h (step S501) and relays the packet to the address k (step S502). This procedure allows for more appropriate relay destination node selection.

When no receipt confirmation response has been received from a relay destination node only once, another relay destination node is immediately selected in this example. However, when no receipt confirmation response has been received from a relay destination node, the packet may be transmitted to the same relay destination node more than once and another relay destination node may be selected when it is determined that all transmissions have failed.

This application is based on Japanese Application No. 2009-019809, which is incorporated herein by reference.

What is claimed is:

1. A packet relay system including a plurality of nodes which relay a data packet to each other, one of the plurality of nodes being a sink node, each one of the nodes including:
    a packet transmitting unit which transmits a hello packet to its own adjacent nodes at predetermined time intervals;
    an arrival rate calculation unit which calculates, for each of said adjacent nodes, an arrival rate of a packet from said sink node, wherein the arrival rate is calculated based upon a sequence number included in a header of the packet and a total number of hello packets received from the sink node;
    a link cost calculation unit which calculates a link cost based on the arrival rate for each of said adjacent nodes;
    an accumulated link cost value acquisition unit which receives the hello packet transmitted from each of said adjacent nodes and acquires, for each of said adjacent nodes, an accumulated value of a link cost calculated by each node in a range of nodes from said sink node to each of said adjacent nodes, said accumulated value being included in the received hello packet;
    a path cost calculation unit which calculates, for each of said adjacent nodes, a path cost by adding the link cost calculated to the accumulated value; and
    a packet relay unit which relays the data packet to one adjacent node on a path having a lowest path cost of the path costs calculated for the adjacent nodes,
    wherein the arrival rate calculation unit, the link cost calculation unit, the accumulated link cost value acquisition unit, the path cost calculation unit, and the packet relay unit are implemented using an electric arithmetic circuit,
    wherein the packet relay unit determines whether a relay of the data packet is successful or not,
    wherein, if it is determined that relay of the data packet to the adjacent node is unsuccessful, the packet relay unit selects another adjacent node of the remaining adjacent nodes other than the one adjacent node in ascending order of the path cost to relay the data packet,
    wherein, if it is determined that relay of the data packet to each of the remaining adjacent nodes is unsuccessful, the packet relay unit re-selects the one adjacent node to relay the data packet, and
    wherein, each time it is determined that the relay of the data packet has been unsuccessful, the packet relay unit counts a number of retransmissions of the data packet and, if the number of retransmissions reaches a predetermined limit value, the packet relay unit terminates the relay process for the data packet.

2. The wireless node according to claim 1, wherein a value indicating the number of retransmissions is included in the data packet, and the packet relay unit subtracts 1 from the value indicating the number of retransmissions each time it is determined that relay of the data packet has been unsuccessful.

3. A wireless node for relaying a data packet through a wireless communication path, the node comprising:
    a packet transmitting unit which transmits a hello packet to its own adjacent nodes at predetermined time intervals;
    an arrival rate calculation unit which calculates, for each of said adjacent nodes, an arrival rate of a packet from a sink node, wherein the arrival rate is calculated based upon a sequence number included in a header of the packet and a total number of hello packets received from the sink node;
    a link cost calculation unit which calculates a link cost based on the arrival rate for each of said adjacent nodes;
    an accumulated link cost value acquisition unit which receives the hello packet transmitted from each of said adjacent nodes and acquires, for each of said adjacent nodes, an accumulated value of a link cost calculated by each node in a range of nodes from said sink node to each of said adjacent nodes, said accumulated value being included in the received hello packet;
    a path cost calculation unit which calculates, for each of said adjacent nodes, a path cost by adding the link cost calculated to the accumulated value; and
    a packet relay unit which relays the data packet to one adjacent node on a path having a lowest path cost of the path costs calculated for the adjacent nodes,
    wherein the arrival rate calculation unit, the link cost calculation unit, the accumulated link cost value acquisition unit, the path cost calculation unit, and the packet relay unit are implemented using an electric arithmetic circuit,
    wherein the packet relay unit determines whether a relay of the data packet is successful or not,
    wherein, if it is determined that relay of the data packet to the adjacent node is unsuccessful, the packet relay unit selects another adjacent node of the remaining adjacent nodes other than the one adjacent node in ascending order of the path cost to relay the data packet,
    wherein, if it is determined that relay of the data packet to each of the remaining adjacent nodes is unsuccessful, the packet relay unit re-selects the one adjacent node to relay the data packet, and
    wherein, each time it is determined that the relay of the data packet has been unsuccessful, the packet relay unit counts a number of retransmissions of the data packet and, if the number of retransmissions reaches a predetermined limit value, the packet relay unit terminates the relay process for the data packet.

4. The wireless node according to claim 3, wherein a value indicating the number of retransmissions is included in the data packet, and the packet relay unit subtracts 1 from the value indicating the number of retransmissions each time it is determined that relay of the data packet has been unsuccessful.

* * * * *